United States Patent Office 3,522,024
Patented July 28, 1970

3,522,024
HYDROCARBON REFORMING
William G. Billings and William T. Nelson, Bartlesville, Okla., assignors to Phillips Petroleum Company, a corporation of Delaware
No Drawing. Continuation-in-part of application Ser. No. 553,299, May 27, 1966. This application June 22, 1967, Ser. No. 647,935
Int. Cl. C10g *11/02, 11/04, 11/28*
U.S. Cl. 48—214          6 Claims

ABSTRACT OF THE DISCLOSURE

Hydrocarbons are steam-reformed to a gaseous product rich in methane, fungible with natural gas, by contacting with a supported nickel catalyst promoted with a barium salt of an organic acid.

BACKGROUND OF THE INVENTION

This is a continuation-in-part application of copending application having Ser. No. 553,299, filed May 27, 1966, now abandoned.

This invention relates to the production of gases rich in methane fungible with natural gas from non-methane containing feedstocks and feedstocks lean in methane. In accordance with one aspect, this invention relates to the conversion of hydrocarbons containing from 2 to 15 carbon atoms per molecule to a gaseous product rich in methane by contacting with a barium promoted nickel catalyst. In accordance with a further aspect, this invention relates to the conversion of light hydrocarbons such as propane to a gaseous product rich in methane fungible with natural gas by contacting with a barium acetate treated nickel-alumina catalyst in the presence of steam.

Utility companies which distribute gas for household or other use have an increasing acute need for an economical means of supplying gas during peak-load periods. During cold weather, for example, demand may be double or triple the volume used on a mild day. In many instances, the peak-load demand is met by adding propane-air mixtures to the gas. Because the quantity of propane-air that can be blended is limited, there is a need for an economic process that can be used to supply peak-load demand.

Accordingly, the present invention relates to an improved process and catalyst for the production of methane-containing gases fungible with natural gas from hydrocarbon feedstocks, particularly light hydrocarbon feedstocks containing propane.

An object of this invention is to provide a new and improved catalyst useful for the conversion of hydrocarbons to a methane-rich gas.

Another object of this invention is to provide a new and improved catalyst having increased catalyst life useful for the steam reforming of hydrocarbons to produce methane-rich gaseous products.

Another object of this invention is to provide an improved process for the conversion of hydrocarbons to methane-rich gaseous products fungible with natural gas.

A further object of this invention is to provide an improved process and catalyst whereby light hydrocarbons such as propane are converted to gaseous products rich in methane fungible with natural gas.

Other aspects, objects, as well as the several advantages of this invention, will be apparent to one skilled in the art from a study of this disclosure and the appended claims.

SUMMARY OF INVENTION

According to the invention, a process is provided for the production of methane-containing gases fungible with natural gas from hydrocarbon feedstocks which comprises contacting said feedstock and steam with a nickel catalyst promoted with a barium salt of an organic acid such as barium acetate.

Further, in accordance with the invention, a novel and improved catalyst useful for the conversion of hydrocarbons to methane-rich gaseous products is provided which comprises a supported nickel catalyst promoted with a barium salt of an organic acid such as barium acetate. Preferably, the support for the nickel catalyst comprises an alumina-containing support material such as alumina and calcium aluminate.

In accordance with one embodiment of the invention, the hydrocarbon feedstock prior to contacting with the promoted nickel catalyst is subjected to a pretreatment to remove sulfur compounds by passing the feedstock through one or more guard chambers containing adsorptive materials such as molecular sieves, zinc oxide, and the like.

In accordance with a further embodiment of the invention, a portion of the hydrocarbon feedstock, especially hydrocarbon feedstocks containing propane, is bypassed around the reforming zone and introduced into the reformate so as to increase the heating value of the reformate.

PREFERRED EMBODIMENTS

The hydrocarbon feedstocks processable to methane-rich products according to the invention comprise hydrocarbons having from 2 to about 15 carbon atoms per molecule. Such feedstocks preferably contain predominantly paraffinic hydrocarbon such as propane, butane, hexane, octane, decane, dodecane, pentadecane, and the like. The hydrocarbon feedstock can contain minor amounts of unsaturated materials when desired. The higher molecular weight hydrocarbons in the feedstock will ordinarily have a maximum boiling point of about 500° F.

The reforming temperature employed can vary appreciably, but preferably will be in the range 600–1000° F. for best results in obtaining gaseous products rich in methane. The reaction pressure will ordinarily be 100–500 p.s.i.g., but higher pressures can be used to advantage to give a product gas containing more methane and carbon dioxide and less hydrogen and carbon monoxide. The steam to hydrocarbon weight ratio is ordinarily at least 1.2 to 1, generally in the range 1.2–6 to 1. The total gaseous hourly space velocity (GHSV) ordinarily ranges from 500–40,000 volumes of gas per volume of catalyst per hour, calculated at 32° F. and one atmosphere.

The nickel catalyst used in the process of our invention prior to impregnation with the barium salt can be either non-reduced or reduced and stabilized to prevent reaction with the oxygen in the air. The catalyst used in the process of our invention is preferably a supported nickel catalyst such as nickel-alumina-containing material containing 5 to 90 weight percent nickel on a reduced basis and 1 to 10 weight percent barium salt.

Instead of alumina, other natural or synthetic refractory base material supports, such as silica, alumina, zirconia, thoria, beryllia, boria, magnesia, titania, binary combinations thereof such as silica-alumina, silica-magnesia, boria-alumina magnesia-alumina, beryllia-titania, and the like, and ternary combinations thereof, such as silica-alumina-thoria, silica-magnesia-zirconia, alumina-beryllia-titania, and the like; naturally occurring supports such as kieselguhr, diatomaceous earth, fuller's earth, perlite, and the like; Group II aluminate spinels and mixtures thereof, including mixtures of spinels and excess Group II metal oxide or spinels and excess alumina, such as calcium aluminate, zinc aluminate, magnesium aluminate, barium aluminate, beryllium aluminate, strontium aluminate, and the like; natural or synthetic crystalline alumino-silicates such as levynite, erionite, faujasite, analcite, noselite, heulandite, stilbite, phillipsite, brewsterite, datolite, chabazite, Keucite, scapolite, mordenite, sodalite, calcium aluminosilicate, barium aluminosilicate, and the like, can be used. The nickel catalyst of the invention exhibits a considerably longer catalyst life than is obtained with other prior art promoted nickel catalyst.

Other alumina-containing supports can be used in this invention, and by alumina-containing is meant a compound containing $Al_2O_3$. For example, calcium aluminate can be represented by the chemical formula $CaO \cdot Al_2O_3$, calcium alumino-silicate by $CaO \cdot Al_2O_3 \cdot 2SiO_2$, and aluminum silicate by $Al_2O_3 \cdot SiO_2$ and $3Al_2O_3 \cdot 2SiO_2$.

As is demonstrated by the specific working examples hereinbelow, steam reforming of hydrocarbons according to the invention results in a gaseous product fungible with natural gas, which product contains as much as 70–90 percent methane, calculated on a $CO_2$- and $C_3H_8$-free basis.

The catalyst can be prepared by any of the procedures known to the industry, such as by impregnation of the support with aqueous or non-aqueous solutions of the active ingredients, coprecipitation of the active and support ingredients, physical mixing, and the like. The barium promoter can be added before, during, or after the addition of the nickel to the support, and can be added in the form of any salt of an organic acid or hydroxy-substituted organic acid that is soluble in water or an organic solvent. Any suitable nickel salt, such as nickel acetate, nickel nitrate, and the like, can be used. Examples of barium salts that can be used are the formate, acetate, propionate, butyrate, caproate, malate, gluconate, benzoate, salicylate, mandelate, cinnamate, and the like. A presently preferred method for preparing the catalyst of the invention is to precipitate a basic nickel carbonate in the presence of a support such as alumina, filter, dry, impregnate with a solution of a barium salt of an organic acid, and dry. For use in fixed-bed operation, the catalyst can be granulated or pelleted at any suitable point during the preparation, such as after the formation of a nickel-support mixture or after the formation of barium-nickel-support mixture. For use in fluidized-bed operation such granulation or pelleting is unnecessary. As indicated above, the nickel component of the catalyst can be reduced and stabilized to prevent reaction with the oxygen in the air at any point subsequent to the addition of the nickel. Such reduction and stabilization permits loading the catalyst into the reactor and using it without a reduction step. However, it is within the scope of the invention to reduce the catalyst with hydrogen or a hydrogen-containing gas after it is in the reactor.

The use of alkali or alkaline earth promoters in nickel-containing steam reforming catalysts is known. However, according to the invention, we have shown that the use of a particular alkaline earth in the form of a soluble salt of an organic acid results in the production of a catalyst that is more active than a similar catalyst using the promoter most used in catalysts of commerce, i.e., potassium carbonate.

As indicated hereinbefore, hydrocarbon feedstocks containing contaminants such as sulfur-containing materials, are preferably treated prior to contacting in the reforming zone with the promoted nickel catalyst to remove the sulfur-containing materials. In a presently preferred procedure, the hydrocarbon feedstock is first passed through a guard chamber bed containing a molecular sieve and then through a second guard chamber bed containing zinc oxide. It is within the scope of the invention to use either or both of the beds, depending upon the contaminants present in the feedstock being treated, and to use the beds either in the same or separate guard chambers. In the event that the hydrocarbon feedstock contains carbonyl sulfide (COS), both guard chambers are employed. It has been found that the zinc oxide is effective for removing carbonyl sulfide as well as other residual sulfur compounds at elevated temperature and pressure. At ambient conditions, the zinc oxide removes only $H_2S$.

In actual operation the molecular sieve guard chamber is ordinarily operated at a temperature in the range 75–200° F., a pressure of 100–600 p.s.i.g., or sufficient pressure to maintain the hydrocarbons in liquid phase, and a liquid hourly space velocity for hydrocarbon feed of 1–30. A presently preferred molecular sieve for use in the first guard chamber is the 13–X molecular sieve.

In actual operation the second guard chamber, or zinc oxide reactor, is ordinarily operated at a temperature in the range 550–850° F. a pressure in the range of 100–600 p.s.i.g., and a hydrocarbon feed liquid hourly space velocity of 1–10. If desired, steam can be introduced into the hydrocarbon feedstock between the guard chambers or subsequent to the zinc oxide contactor. In the event of addition of steam prior to the zinc oxide contactor, the steam to hydrocarbon weight ratio is ordinarily 0.2 to 1 to 4 to 1.

The zinc oxide contactor ordinarily uses any available zinc oxide, natural or synthetic, having a zinc oxide content greater than about 10 weight percent, and preferably greater than about 50 weight percent. The zinc oxide contact area is ordinarily operated under vapor phase conditions withoor without steam as indicated above.

As indicated hereinbefore, it is also within the scope of the invention to bypass a portion of the hydrocarbon feedstock around the guard chambers and/or the reforming zone and introduce same into the reformate to increase the heating value. It is within the scope of the invention to control the ratio of the amount of hydrocarbon bypassing the reforming zone to that reformed with a controller responsive to B.t.u. and density analyzers on the combined bypassed hydrocarbon/reformate stream. This embodiment of the invention is particularly useful when propane-containing feedstocks are being processed. The propane bypassed and introduced into the reformate will materially increase the heating value. The propane can be bypassed from the feed entering into the first guard chamber into the reformate, or be taken from the feed stream between the guard chambers and introduced into the reformate, or from the effluent from the last guard chamber and introduced into the reformate.

Example I

The catalysts used in the runs made to demonstrate the process of the invention were obtained by impregnating ⅛-inch nickel-alumina pellets (Girdler G–12) with an aqueous solution of either potassium carbonate or barium acetate, drying at about 230° F., and reducing in hydrogen for 12 hours at 800° F. They contained 46 weight percent nickel (after reduction) and either 3 weight percent potassium carbonate (Catalyst K) or 4.9 weight percent barium acetate (Catalyst Ba). They were used in the steam reforming of propane at 300 p.s.i.g.

TABLE III

| | Catalyst | | | | | | |
| --- | --- | --- | --- | --- | --- | --- | --- |
| | K | | | Ba | | | |
| Run Number | 1 | 2 | 3 | 4 | 5 | 6 | 7 |
| Time in Run, hr | 2.5 | 10.0 | 13.3 | 1 | 337 | 440 | 461 |
| Temperature, °F.: | | | | | | | |
| Inlet | 795 | 795 | 795 | 790 | 795 | 655 | 685 |
| Outlet | 835 | 855 | 855 | 850 | 845 | 825 | 845 |
| GHSV of $C_3H_8+H_2O$ | 1,125 | 3,360 | 3,440 | 3,460 | 3,460 | 5,520 | 6,540 |
| Steam/$C_3H_8$, wt | 1.55 | 1.84 | 1.84 | 1.64 | 1.64 | 1.76 | 1.51 |
| $C_3H_8$ Conv., wt. percent | 99 | 97 | 95 | 100 | 100 | 100 | 99.7 |
| Dry Gas Composition, mol percent: | | | | | | | |
| $H_2$ | 11.5 | 13.2 | 15.0 | 12.0 | 11.7 | 8.4 | 10.8 |
| $CH_4$ | 68.5 | 68.2 | 65.8 | 70.9 | 71.0 | 74.5 | 71.8 |
| $C_2H_6$ | 0.0 | 0.6 | 0.7 | 0.0 | 0.0 | 0.0 | 0.0 |
| $C_3H_8$ | 0.2 | 1.0 | 1.5 | 0.0 | 0.0 | 0.0 | 0.1 |
| $CO_2$ | 19.8 | 17.0 | 17.0 | 17.1 | 17.3 | 17.1 | 17.3 |

Comparison of the data for runs 1 and 2 indicates that tripling the hydrocarbon space velocity with the potassium carbonate-containing catalyst resulted in a decrease in conversion, even with a compensating increase in temperature of 20°. Comparison of the data for runs 2 and 3 indicate that activity of the potassium carbonate-containing catalyst had started to decrease after 13 hours' use. With the barium acetate-treated catalyst it was possible to operate at both higher space velocities and lower temperatures and still obtain essentially complete hydrocarbon conversion (runs 6 and 7 versus runs 4 and 5), even with catalyst that had been ued for over 400 hours.

Interchangeability or fungibility of other gases with natural gas is related to a number of factors, the major ones of which are (1) the tendency of the flame to flash back, (2) the tendency of the flame to lift off the burner, and (3) the tendency of the gas to burn incompletely. As a result of studies made by a number of workers, the following diagram has been developed by P. Delbourg (Compt. rend. congr. ind. gas, 68th Congr., Paris, 1951, 744–96) for the limits of interchangeability of other gases with natural gas. The pie-shaped area represents the area of interchangeability or fungibility.

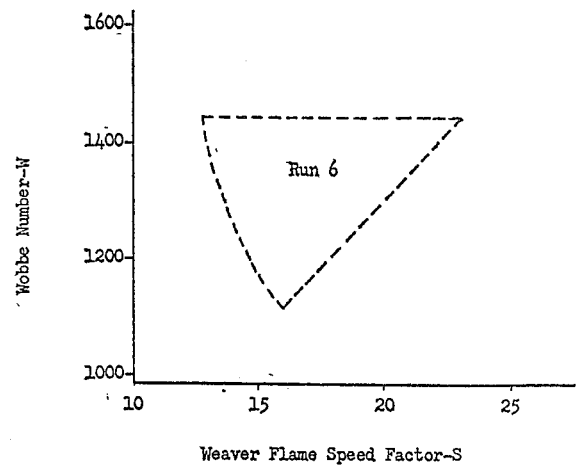

In this diagram the Wobbe Number is releated to the calorific value of the gas (in B.t.u. per cubic foot) by the following equation:

$$W = \text{Calorific Value}/(\text{Specific Gravity})^{1/2}$$

Calculation of the Weaver Flame Speed Factor S is described in J. Res. Natl. Bur. Stds. 46, 213–245 (1951).

The $CO_2$-free products of all the runs are fungible with natural gas, or can be made so by addition of propane. For purposes of illustration, the Wobbe number pane. For purposes of illustration, the Wobbe Number and Weaver Flame Speed Factor are shown for the $CO_2$-free product of run 6. Thus, these materials are highly desirable for blending with natural gas to meet peak-load demands.

Example II

A propane reforming test was made at 300 p.s.i.g. with a catalyst prepared by impregnating a pre-reduced, stabilized nickel-calcium aluminate catalyst (Girdler G–65RS) with an aqueous solution of barium acetate to give 5 weight percent barium acetate and drying:

Time in run, hr. _____ 155
Temperature, °F.:
  Inlet _____ 715
  Outlet _____ 799
GHSV of $C_3H_8+H_2O$ _____ 3240
Steam/$C_3H_8$, wt. _____ 1.56
$C_3H_8$ conv., wt. percent _____ 99.7
Dry gas composition, mol percent:
  $H_2$ _____ 8.1
  $CH_4$ _____ 75.1
  $C_2H_6$ _____ 0.0
  $C_3H_8$ _____ 0.1
  $CO_2$ _____ 16.7

It was not necessary to reduce the impregnated catalyst prior to use. The catalyst was active when put on stream. The catalyst contained 21.4 weight percent nickel.

Use of the pre-reduced, stabilized nickel catalyst for the preparation of the finished catalyst is highly desirable, because it is only necessary to impregnate with the barium salt solution, dry, and start reforming. There is no reduction period required, and there is no induction period of low activity during reforming. The pre-reduced catalysts are prepared by reduction with hydrogen followed by just enough surface-treating with an oxygen-containing gas to form enough nickel oxide on the surface to prevent spontaneous oxidation during shipping. Most of the nickel is in reduced form.

Example III

The effectiveness of zinc oxide in the removal of sulfur-containing materials from hydrocarbons is demonstrated by the two specific runs that follow:

(1) Complete sulfur removal from propane containing 122 p.p.m. total sulfur was obtained for 27 days using a 20/40 mesh (U.S. Sieve) commercial zinc oxide containing about 93 weight percent ZnO under the following conditions:

Temperature, °F. _____ 600
Pressure, p.s.i.g. _____ 300
Propane, LHSV [1] _____ 2.8
Steam/propane, wt. _____ 0.35/1–1.75/1 (variable)

[1] Liquid volumes of propane per volume of catalyst per hour; corresponds to GHSV of 700–725.

(2) Compete sulfur removal from propane containing 145 p.p.m. sulfur as dimethylsulfide was obtained for 14 days using a commercial zinc oxide (1/8-inch lengths of 3/16-inch extrudate) containing about 73 weight percent ZnO under the following conditions:

Temperature, °F. _____ 780
Pressure, p.s.i.g. _____ 300
Propane, LHSV _____ 2.8
Steam/propane, wt. _____ 0

Reasonable variation and modification are possible within the scope of the foregoing disclosure and the appended claims to the invention, the essence of which is that there is provided a process and catalyst for the production of methane containing gases fungible with natural gas from hydrocarbon feedstocks, such as propane, comprising contacting said feedstocks with steam and a barium promoted supported nickel catalyst.

We claim:

1. A steam reforming process for the production of gases rich in methane fungible with natural gas from hydrocarbon feedstocks which comprises contacting a hydrocarbon feedstock containing predominantly paraffinic hydrocarbons having 2–15 carbon atoms per molecule with steam and a catalyst consisting of calcium aluminate supported nickel impregnated with 1–10 weight percent of a barium salt of an organic acid, said contacting being effected at a temperature in the range 600–1000° F., a reaction pressure in the range 100–500 p.s.i.g., a gaseous hourly space velocity (GHSV) ranging from 500–40,000 volumes of gas per volume of catalyst per hour and a steam to hydrocarbon weight ratio in the range 1.2–6 to 1 to produce a reaction effluent containing at least 70 mol percent methane, which effluent is fungible with natural gas.

2. A process according to claim 1 wherein the impregnated catalyst contains from 5 to 90 weight percent nickel, said barium salt is barium acetate and said hydrocarbon feedstock comprises propane.

3. A process according to claim 1 wherein said hydrocarbon feedstock is passed through a guard chamber containing zinc oxide to remove sulfur-containing materials prior to said contacting.

4. A process according to claim 1 wherein said feedstock is first passed through a guard chamber containing a molecular sieve and then through a second guard chamber containing zinc oxide to remove sulfur-containing materials from the feedstock prior to said contacting.

5. A process according to claim 1 wherein the nickel-calcium aluminate is pre-reduced and then impregnated with barium acetate, dried and then used for reforming.

6. A process according to claim 1 wherein said hydrocarbon feedstock is propane and a portion thereof is bypassed around said contacting and introduced into the effluent therefrom so as to increase the heating value of the reformate produced.

References Cited

UNITED STATES PATENTS

| 2,738,262 | 3/1956 | Benz et al. | 48—214 X |
| 3,051,646 | 8/1962 | Brooke | 208—91 X |
| 3,119,667 | 1/1964 | McMahon. | |
| 3,201,214 | 8/1965 | Fox et al. | 48—214 |
| 3,271,325 | 9/1966 | Davies et al. | 48—214 |
| 3,300,324 | 1/1967 | Fails | 48—196 |
| 3,320,182 | 5/1967 | Taylor et al. | 48—214 X |
| 3,334,055 | 8/1967 | Dowden et al. | 48—214 X |
| 3,377,138 | 4/1968 | Gutmann et al. | 23—2.1 X |
| 3,423,194 | 1/1969 | Kearby | 48—214 |

JOSEPH SCOVRONEK, Primary Examiner

U.S. Cl. X.R.

23—2; 252—430